Jan. 15, 1957  R. L. FRANK  2,778,011
APPARATUS FOR TIME-DELAY MEASUREMENT
Filed Dec. 7, 1949  3 Sheets-Sheet 2

INVENTOR
ROBERT L. FRANK
BY
ATTORNEY

Jan. 15, 1957  R. L. FRANK  2,778,011
APPARATUS FOR TIME-DELAY MEASUREMENT
Filed Dec. 7, 1949  3 Sheets-Sheet 3
*Fig. 5.*
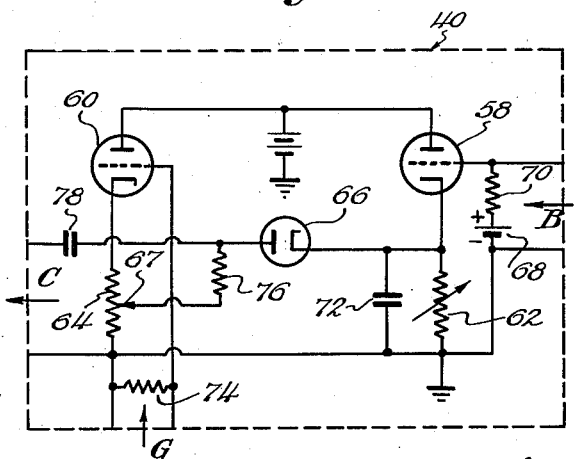
*Fig. 6.*
*Fig. 7.*
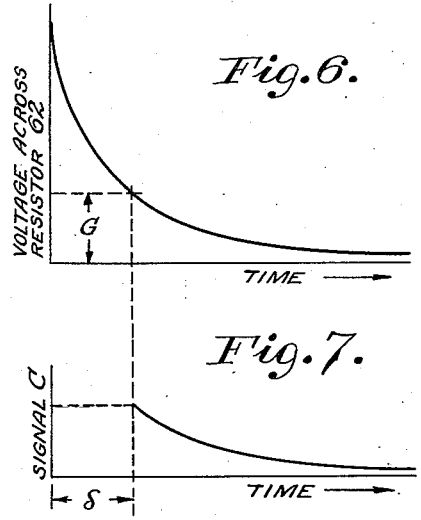
*Fig. 8.*
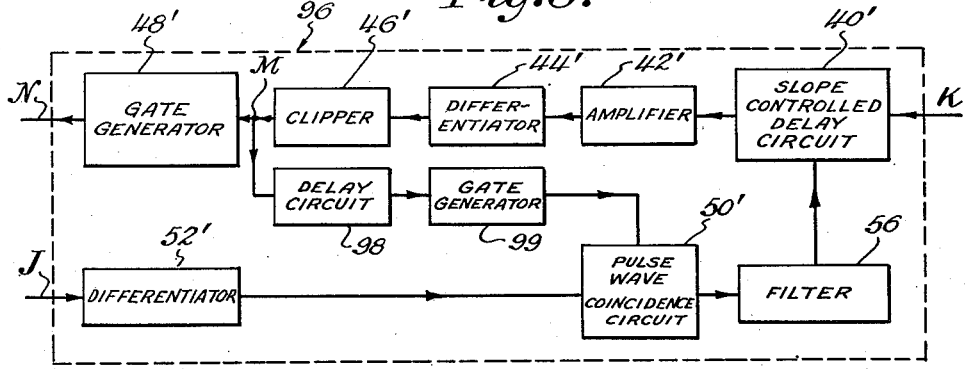
*Fig. 9.*
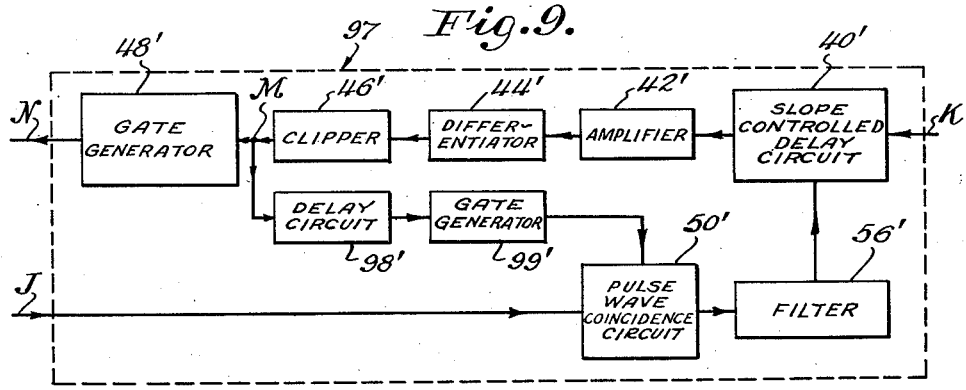
INVENTOR
ROBERT L. FRANK
BY
Paul B. Hunter
ATTORNEY _United States Patent Office_

2,778,011
Patented Jan. 15, 1957

2,778,011

APPARATUS FOR TIME-DELAY MEASUREMENT

Robert L. Frank, New York, N. Y., assignor to Sperry Rand Corporation, a corporation of Delaware Application December 7, 1949, Serial No. 131,677

10 Claims. (Cl. 343—103)

This invention relates to automatic synchronizer circuits and particularly to completely automatic apparatus for indicating the time-delay between a pair of recurrent pulses.

Automatic systems for indicating the time-delay between a pair of recurrent pulses are known in the prior art. Generally, such systems are actuated by the amplitude of the control pulses and hence are adversely affected by random noise signals and by changes in the amplitude or wave form of the control pulses so that the synchronized pulses do not always occur in precisely the same time relation with reference to the respective control pulses; e. g., in Loran systems pulses of carefully controlled shape are transmitted in predetermined time relation from two locations and receiving equipment on a mobile craft is employed to receive and detect the pulses and to provide a measure of the time-delay between the pulses received from the two locations, from which a hyperbolic line of position of the craft is ascertained. The accuracy with which the line of position is determined depends, of course, upon the accuracy of the time-delay measurement. This, in turn, has in the past been limited by the appreciable effects of sky-wave interference (night effect) and consequent distortion of the pulse wave forms received. Prior pulse timing circuits and devices have been quite vulnerable to this "sky-wave" distortion, and vulnerable also to the effects of noise in the output of the Loran radio receiver.

Copending application S. N. 117,917 filed September 15, 1949, by Walter N. Dean on Pulse Synchronizer discloses semi-automatic apparatus for indicating the time delay between a pair of recurrent pulses. The apparatus disclosed by Dean is a large time-constant servo synchronizer system which is controlled by the rate of increase in the magnitude of the recurrent pulses and hence it is substantially free from the effects of "sky-wave" distortion and random noise signals. However, the apparatus disclosed by Dean must be adjusted by an operator or the operator must make a time measurement on the screen of a cathode-ray tube in order to measure the time-delay between the two recurrent pulses.

Copending application S. N. 131,684 filed by Philip W. Crist on the same date as the present application discloses and claims the slope correction circuit disclosed in the present application.

The present invention is a pulse synchronizer which is an improvement over the synchronizer disclosed by Dean providing completely automatic apparatus for measuring the time-delay between pairs of Loran pulses. In a preferred embodiment, a large time-constant servo system which is controlled by the rate of increase in the magnitude of the respective Loran pulses is employed to effect synchronization, and precise control of the synchronization is achieved by employing a variable delay circuit for introducing a delay in the servo system which varies inversely and substantially exponentially with a control voltage which has a magnitude which varies directly in accordance with the rate of increase in the magnitude (i. e., slope) of the respective Loran pulses at the times when the respective Loran pulses attain a predetermined amplitude. Completely automatic operation is attained by employing in the servo system a servomotor which is caused to rotate an amount proportional to the time-delay between the Loran pulses. The time-delay is determined by observing an indicator which shows the amount of rotation of the servomotor.

Accordingly, it is an object of this invention to provide a completely automatic Loran receiving system of correct accuracy and reliability which is not affected by sky-wave interference or by changes in the amplitude of the pulses received or by random noise signals in the output of the Loran receiver.

Another object of the invention is to provide automatic pulse synchronization apparatus which is responsive to the rate of increase in the magnitude of each of the control pulses.

Further objects and advantages of the invention will be apparent from the following description, the appended claims and the drawings, in which:

Figs. 3 and 4 show two alternative embodiments of the frequency controlled oscillator and pulse generator shown in block diagrammatic form in Fig. 1;

Fig. 5 shows a schematic diagram of the slope controlled delay circuit shown in block diagrammatic form in Fig. 1;

Figs. 6 and 7 are two curves illustrating the operation of the apparatus shown in Fig. 5; and Figs. 8 and 9 show alternative embodiments of the slope correction circuit shown in the block diagram of Fig. 1.

In the discussion of the preferred embodiment of this invention which follows, frequent reference will be made to Fig. 2 which shows the wave form of and time relations between the various signals which occur in the apparatus disclosed in Fig. 1. It is to be observed that the letter which identifies each curve in Fig. 2 is also employed in Fig. 1 to identify the circuit which conveys the corresponding signal.

Figure 1:
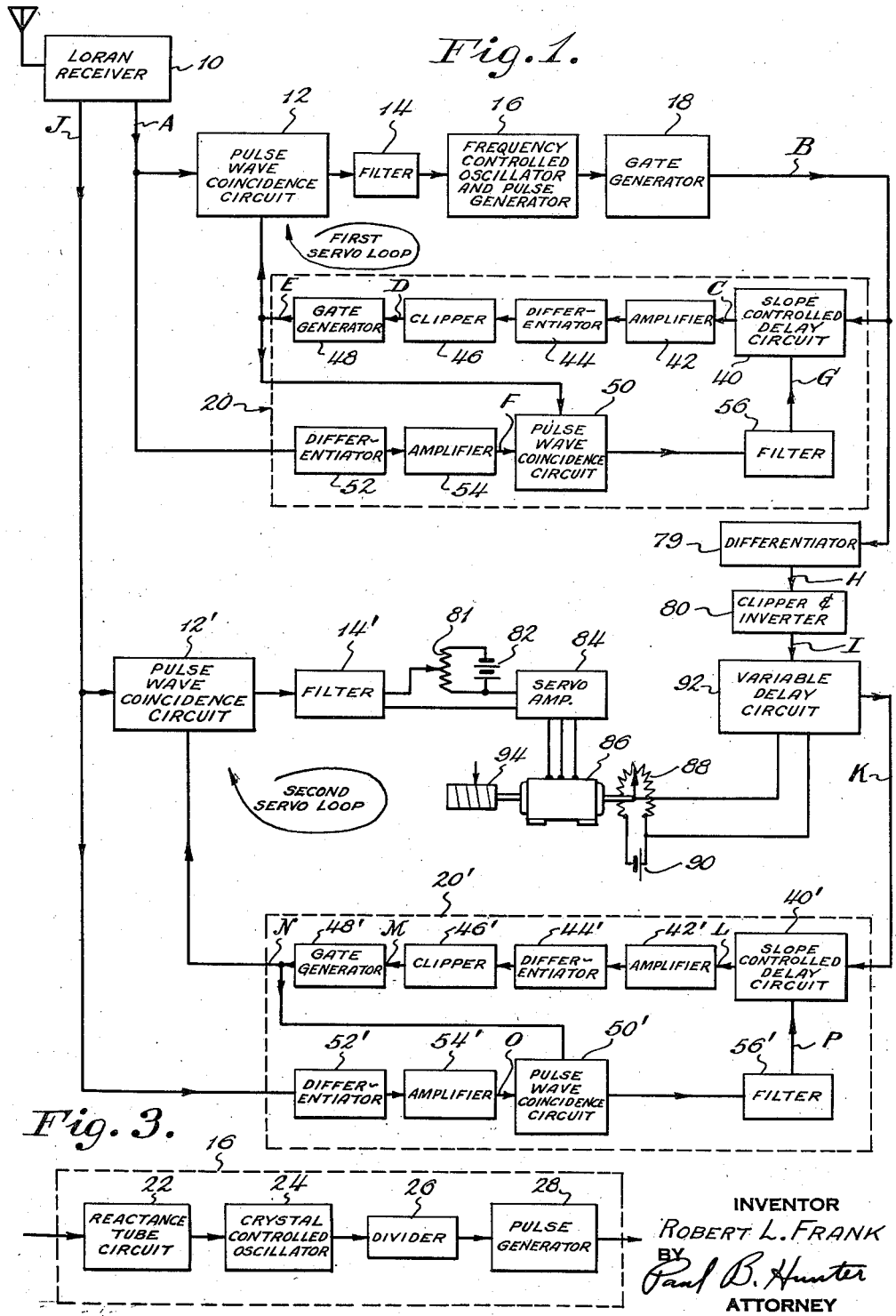
Fig. 1 is a block diagrammatic disclosure of the completely automatic synchronizer apparatus showing how it may be employed in a Loran receiving system.
Figure 2:
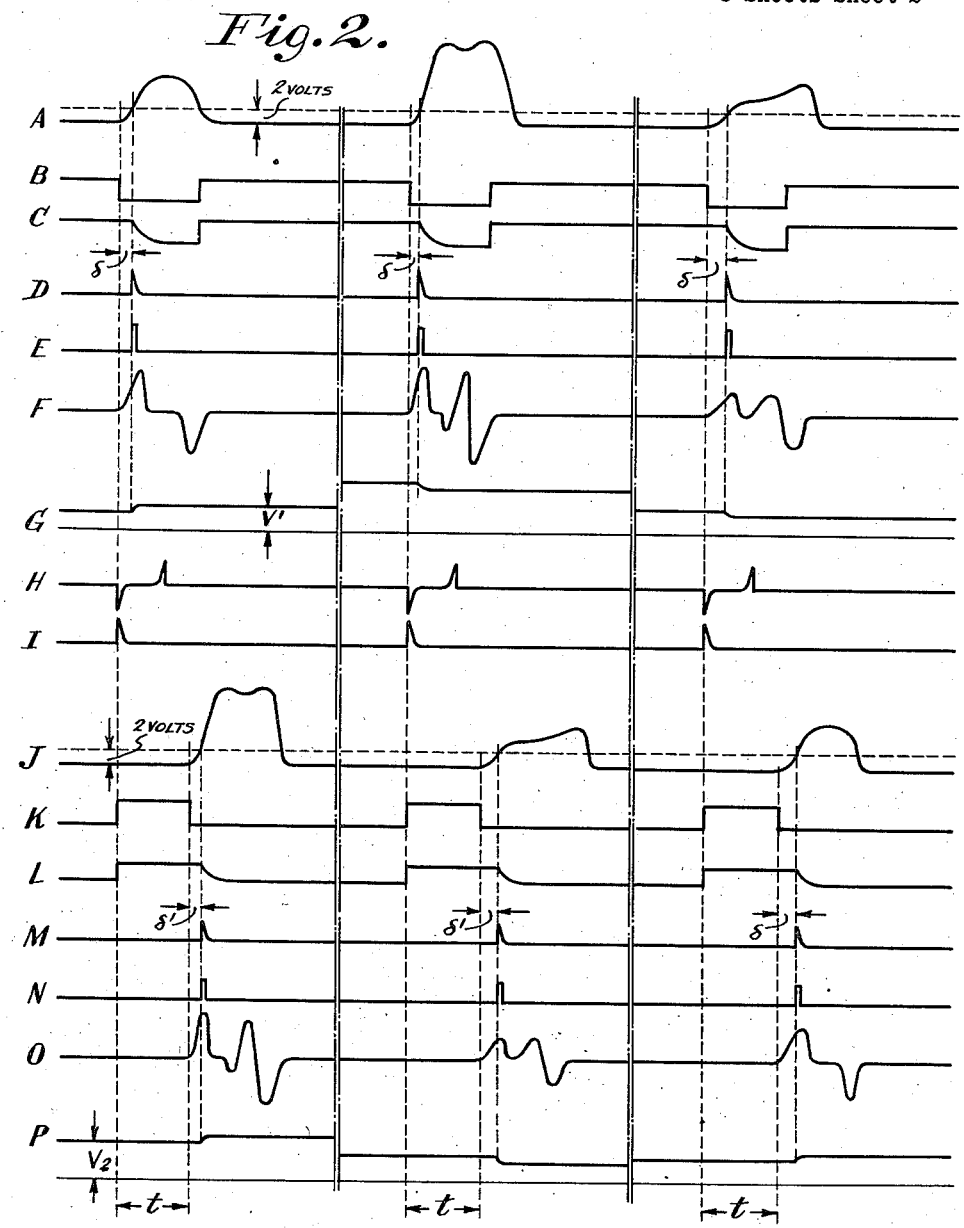
Fig. 2 shows various curves representing the wave form of and time relationships between signals which are produced in the various parts of the apparatus shown in Fig. 1.

Referring now to Figs. 1 and 2, the Loran receiver 10 serves to receive and detect the master and slave signals produced by a Loran transmitting system (not shown). The detected master pulses are produced at A and the detected slave pulses are produced at J.

The wave forms shown for the master pulses A and the slave pulses J are illustrative of the wave forms actually received under three normal operating conditions in which the receiving apparatus is located a variable distance from the master and slave transmitters of the Loran system. The first master pulse A and the third slave pulse J are not affected by sky-wave interference. The second and third master pulses A and the first and second slave pulses J are affected by sky-wave interference which distorts the trailing edges of these pulses. The difference in the amplitudes of the pulses results from differences in the distance between the Loran receiver and the transmitters of the Loran system and to some extent from differences in the atmospheric conditions.

The master pulses A are applied to a first servo loop which comprises a pulse wave coincidence circuit 12, a filter 14, a frequency controlled oscillator and pulse generator 16, a gate generator 18, and a portion of a slope correction circuit 20. The pulse wave coincidence circuit 12 is a sampling circuit such as the four diode type shown on page 12 of the Proceedings of the Institute of Radio Engineers for January, 1943 and which serves to sample the magnitude of the pulses A during each of the gates E which are applied to the control circuit thereof, thereby producing output signals having magnitudes which are substantially equal to the magnitude of the pulses A during each of the gates E. The filter 14, which may be a conventional type employing lumped constants, has a long time-constant with respect to the repetition rate of the received master pulses A. The frequency controlled oscillator and pulse generator 16 may be either of the types shown in Figs. 3 and 4. The gate generator 18 may be a conventional type and it serves to produce a negative gate B having a duration of the order of the duration of each of the master pulses A.

Fig. 3 shows a frequency controlled oscillator and pulse generator 16 which is primarily adapted for use in Loran systems in which the pulses have a single repetition rate. A reactance tube circuit 22, which is responsive to the output of the filter 14, is employed to vary the frequency of a crystal controlled oscillator 24 over a small range. The frequency of the output of oscillator 24 is reduced to the repetition rate of the master pulses A by a divider 26 which may be a conventional type, and the output of the divider 26 is applied to a pulse generator 28 which serves to produce a pulse of short duration in response to each cycle of the output of the divider 26.

Figure 4:
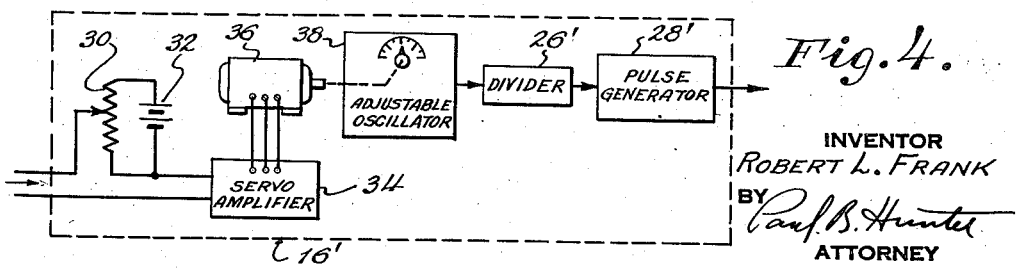

The alternative frequency controlled oscillator and pulse generator 16' shown in Fig. 4 is primarily adapted for use in Loran systems in which more than one transmitter system is employed and some of the transmitter systems produce pulses having a repetition rate which differs from the repetition rate of the pulses produced by the other transmitter systems. It will be understood that the generator shown in Fig. 3 is interchangeable with that shown in Fig. 4 for Loran systems in which the repetition rates differ by moderate amounts. Referring now to Fig. 4, a potentiometer 30 which is connected across a battery 32 serves to complete the circuit between the filter 14 and a servo amplifier 34, and the voltage introduced into the servo loop by the potentiometer 30 is of opposite polarity to the voltage produced by the filter 14. The output of the servo amplifier 34 is applied to a servomotor 36 which serves to control the frequency of an adjustable oscillator 38 over the required frequency range. The frequency of the output of the adjustable oscillator 38 is reduced to the repetition rate of the master pulses A by a divider 26' which may be the same type as the divider 26, and the output of the divider 26', is applied to a pulse generator 28' which may be the same type as the pulse generator 28 and serves to produce a pulse of short duration in response to each cycle of the output of the divider 26'.

An important feature of the slope correction circuit 20 is a slope controlled delay circuit 40 which will be described in detail hereinafter. Gates B and signal G (which has a magnitude which varies in accordance with the rate of increase in the magnitude of the respective master pulses A) are applied to the slope controlled delay circuit 40 and signals C are produced thereby which are delayed a time δ after the leading edges of the respective gates B. The time-delay δ varies substantially inversely and exponentially with the magnitude of the signal G.

The signals C are amplified by amplifier 42, the amplified signals are differentiated by a conventional differentiator 44, the differentiated signals are clipped by a conventional clipper 46, and the output D of the clipper 46 is employed to actuate a conventional gate generator 48 to produce gates E which are of very short duration with respect to the duration of each of the master pulses A.

The gates E are applied to pulse wave coincidence circuit 12 and serve to actuate this circuit during each gate E so that the magnitude of the signal A is sampled during each of the gates E. The circuit constants of the first servo loop are proportioned so that the gates E are caused to occur when the respective master pulses attain a predetermined magnitude such as two volts for example. If the frequency controlled oscillator and pulse generator 16 shown in Fig. 3 is employed, this may be accomplished by adjusting the fixed bias voltage on the grid of the reactance tube. If the frequency controlled oscillator and pulse generator 16' shown in Fig. 4 is employed, this may be accomplished by adjusting the potentiometer 30.

The gates E are also applied to the pulse wave coincidence circuit 50 which may be the same type as circuit 12. Also, a differentiated version F of the master pulses A is applied to the pulse wave coincidence circuit 50 by means of a differentiator 52 and an amplifier 54, both of which may be conventional types.

The gates E serve to actuate the pulse wave coincidence circuit 50 so that the magnitude of the signal F is sampled during each of the gates E. The output of the pulse wave coincidence circuit 50 is applied to a filter 56 which preferably has a long time-constant with respect to the time-constant of the filter 14 and produces a signal G which has a magnitude which varies directly in accordance with the rate of increase in the magnitude of the respective master pulses A during each gate E. Signal G is applied to the control circuit of delay circuit 40 and serves to control the delay δ introduced by the slope controlled delay circuit 40.

Since the signals C are caused to occur when the respective master pulses A attain a predetermined amplitude such as two volts, it follows that the gates B are caused to occur a time δ before the respective master pulses attain the amplitude of two volts. It has been found that if the time-delay δ is caused to vary exponentially and inversely with the rate of increase in the magnitude of the respective master pulses A at the times when the master pulses A attain a certain magnitude such as two volts, the true starting point of the master pulses A may be determined by subtracting the time δ from the time at which the master pulses A attain a magnitude of two volts. Since the leading edges of gates B are caused to occur a time δ before signals C, it follows that the leading edges of gates B are precisely coincident with the leading edges of the master pulses A.

The slope controlled delay circuit 40 shown in Fig. 5 serves to produce the signals C which serve to introduce the time-delay δ required.

Referring now to Fig. 5, triode tubes 58 and 60 are employed to produce voltage drops across their respective cathode resistors 62 and 64 which are compared in diode 66 to produce signals C when the voltage between ground and the tap 67 on resistor 64 exceeds the voltage across resistor 62.

Tube 58 is normally supplied with positive grid voltage by means of a battery 68 and a resistor 70. Thus, the tube 58 is normally in a conducting condition and a voltage drop is produced across the cathode resistor 62. When each negative gate B occurs, the tube 58 is biased to cut-off for the duration of the gate and the voltage across the condenser 72 decays exponentially due to the discharge of the condenser 72 through resistor 62. The control signal G is applied across a grid resistor 74 and serves to apply a positive voltage to the grid of tube 60 so that tube 60 is in a conducting condition and a current flows through cathode resistor 64. A portion of the voltage drop across resistor 64 is applied to the plate of tube 66 through resistor 76 and the tap 67 on resistor 64. Resistor 62 and the tape 67 on resistor 64 are adjustable so that the time-delay introduced by circuit 40 may be adjusted.

Thus the signals produced across the resistors 62 and 64 are compared by the diode 66, when the voltage from the plate of diode 66 to ground exceeds the voltage from the cathode of diode 66 to ground, current flows from resistor 64 through resistor 76, diode 66 and signals C (Fig. 7) are produced which, by exponential decays of an otherwise constant voltage each time that the voltage from the tap 67 on resistor 64 to ground exceeds the voltage across resistor 62, indicates the time $\delta$ after the leading edges of gates B at which the respective master pulses A attain a predetermined amplitude such as two volts. This time $\delta$ varies inversely and exponentially with the magnitude of signal G as shown in the curve of Fig. 6.

Suitable circuit constants for the slope controlled delay circuit shown in Fig. 5 are as follows:

| | |
|---|---|
| Triodes 58 and 60 | Type 12AT7. |
| Diode 66 | Type 6AL5. |
| R62 | 15,000 ohms. |
| R64 | 5,000 ohms. |
| R70 | 24,000 ohms. |
| R74 | 10 megohms. |
| R76 | 51,000 ohms. |
| C72 | .0036 mf. |
| C78 | 100 mmf. |
| Battery 68 | 25 volts. |

The gates B are applied to a conventional differentiator 79 which produces a signal H which is applied to conventional clipper and inverter 80 which in turn produces a series of pulses I, each of which occurs in fixed time relation with respect to the instant when the respective master pulses A are initiated.

The slave pulses J are applied to a second servo loop which comprises a pulse wave coincidence circuit 12', a filter 14', a potentiometer 81 and a battery 82 serially connected therewith, a servo amplifier 84, a servomotor 86, a potentiometer 88 and a battery 90 serially connected therewith, a variable delay circuit 92 and a portion of the slope correction circuit 20'. The pulse wave coincidence circuit 12', the filter 14' and the slope correction circuit 20' may be the same as the circuit elements 12, 14, and 20 described above. The servo amplifier 84 and the motor 86 may be conventional types. The variable delay circuit 92 may be a variable-delay one-shot multivibrator such as the type disclosed on page 591 of the book "Electronic Instruments," by Greenwood, Holdam and MacRae, published by the McGraw-Hill Book Company in 1948. The circuit 92 serves to produce a positive gate K which has a duration which varies directly with the magnitude of the control voltage produced by the potentiometer 88.

Pulses I are applied to the input of the variable delay circuit 92 and serve to initiate the respective gate pulses K produced thereby. The gates K are applied to the slope controlled delay circuit 40' which produces a signal L which decays exponentially at times $\delta'$ after the trailing edges of gates K. It will be observed that the slope controlled delay circuit 40' is actuated by the trailing edges of the positive gates K, whereas circuit 40 is actuated by the leading edges of the negative gates B. This is due to the fact that circuit 40' must be actuated by a negative gate and the portions of signal K between each positive gate are employed as negative gates for circuit 40'. Signals L are amplified, differentiated and clipped to produce pulses M which are applied to gate generator 48' which in turn produces gates N which are of very short duration with respect to the duration of slave pulses J. The gates N serve to actuate pulse wave coincidence circuit 12' so that circuit 12' produces signals which are proportional to the magnitude of the slave pulses J during each gate N. This signal is applied to the filter 14' and the output of the filter 14' is applied to the servo amplifier 84 through the search bias potentiometer 81. The voltage introduced into the servo loop by the potentiometer 81 is of opposite polarity to the voltage produced by the filter 14'. The output of the servo amplifier 84 is employed to actuate the motor 86 which in turn controls the position of the potentiometer 88. The output of the potentiometer 88 is applied to the control circuit of the variable delay circuit 92 and serves to control the duration of each gate pulse K.

The second servo loop is adjusted by means of the potentiometer 81 so that each gate N is caused to occur when the respective slave pulses J attain a predetermined magnitude such as two volts.

The slave pulses J are differentiated by differentiator 52' and amplified by amplifier 54' to produce signals I which are sampled by pulse wave coincidence circuit 50' to produce a variable voltage P at the output of filter 56' in the same manner as signal G is produced by slope correction circuit 20. As before, signal P has a magnitude which varies in accordance with the rate of increase in the magnitude of the respective slave pulses J at the time that the respective slave pulses J attain an amplitude of two volts. Signal P is employed to control the delay $\delta'$ introduced by slope controlled delay circuit 40' as discussed above with reference to circuit 40.

The circuit constants of the slope controlled delay circuit 40' are proportioned so that the delay $\delta'$ introduced thereby is precisely equal to the difference in time between the time when the respective slave pulses J are initiated and the time when the slave pulses J attain a magnitude of two volts, as discussed above with reference to slope controlled delay circuit 40. In this manner the trailing edges of gates K are caused to occur precisely at the instant when the respective slave pulses J are initiated. Thus, the duration of gates K is a measure of the time-delay t between the respective master and slave pulses. Since the duration of gates K is determined by the voltage produced by potentiometer 88 which in turn is determined by the position of the rotor of motor 86, it follows that the time-delay t between the master pulses A and the slave pulses J is determined automatically by an indicator 94 which shows the position of the rotor of motor 86.

Figs. 8 and 9 show two alternative slope correction circuits 96 and 97 which may be employed in the place of the slope correction circuit 20 or 20' shown in Fig. 1.

The slope correction circuit 96 differs from the circuit 20 in that no amplifier is employed between the differentiator 52' and the pulse wave coincidence circuit 50' and in that the gates produced by means of delay circuit 98 and gate generator 99 which serve to actuate the pulse wave coincidence circuit 50' are delayed a fixed time after the respective pulses M. In this manner, the differentiated pulses are sampled by the pulse wave coincidence circuit 50' a fixed time after the respective slave pulses J attain a predetermined amplitude such as two volts, thereby providing a measure of the rate of increase in the magnitude of the pulses.

The slope correction circuit 97 shown in Fig. 9 differs from the circuit 96 shown in Fig. 8 in that the slave pulses J are introduced directly to the pulse wave coincidence circuit 50'. As before the pulse wave coincidence circuit 50' is actuated a fixed time after the pulses M as determined by the delay introduced by delay circuit 98'. Thus, since pulse wave coincidence circuit 50' is actuated a fixed time after the respective slave pulses J attain a predetermined amplitude, it follows that the signal produced by circuit 50' varies in accordance with the rate of increase in the magnitude of the respective slave pulses J during the delay time introduced by circuit 98'.

It will be observed that in the apparatus shown in Fig. 1, the master and slave pulses are sampled during the leading edges of the respective pulses so that the sampling process is not affected by sky-wave interference which, in conventional Loran systems, usually occurs about 50 microseconds after the direct wave signals are received.

Furthermore, it will be observed that the various servo loops employ large time-constant filter circuits so as to minimize the effects of random noise signals.

It will be apparent that various modifications may be made in the apparatus disclosed herein. For example, various types of well-known circuits may be employed instead of the four diode type pulse wave coincidence circuits 12, 12', 50 and 50' or instead of the variable-delay one-shot multivibrator type variable delay circuit 92 described herein.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In combination, a sampling circuit having an input circuit adapted to be connected to a first source of recurrent pulses, a first variable delay means responsive to the output of said sampling circuit and having an input circuit adapted to be connected to a second source of recurrent pulses for producing signals delayed with respect to the pulses produced by said second source a time which varies in accordance with the magnitude of the signal produced by said sampling circuit, a second variable delay circuit responsive to the output of said first delay circuit and having a control circuit connected to said input circuit for producing signals delayed with respect to the signals produced by said first delay circuit a time which varies inversely in accordance with the rate of increase in the magnitude of the pulses of said first series, and means for actuating said sampling means in response to the signals produced by said second delay circuit.

2. The apparatus of claim 1 further including means for indicating the time-delay introduced by said first variable delay circuit.

3. In combination, a sampling circuit having an input circuit adapted to be connected to a source of recurrent control pulses, a servomotor responsive to the output of said sampling circuit, means for producing a signal which varies in accordance with the position of the rotor of said motor, a first variable delay means responsive to said signal and having an input circuit adapted to be connected to a second source of recurrent pulses for producing signals delayed with respect to the pulses produced by said second source a time which varies in accordance with the magnitude of the signal produced by said sampling circuit, a second variable delay circuit responsive to the output of said first delay circuit and having a control circuit connected to said input circuit for producing signals delayed with respect to the signals produced by said first delay circuit a time which varies inversely in accordance with the rate of increase in the magnitude of the pulses of said first series, and means for actuating said sampling means in response to the signals produced by said second delay circuit.

4. The apparatus of claim 3 further including means for indicating the position of the rotor of said motor and thereby indicating the time-delay between said control pulses and said series of signals.

5. A servo system comprising a pulse wave coincidence circuit having input, output and control circuits, a servomotor responsive to the output of said coincidence circuit, means for producing a control signal which varies in accordance with the position of the rotor of said motor, a first variable delay circuit having input, output and control circuits, the control circuit of said delay circuit being connected to said control signal producing means and serving to cause said first delay circuit to produce output signals delayed with respect to signals applied to said input circuit a time which varies in accordance with the magnitude of said control signal, and a second variable delay circuit connected between the output of said first delay circuit and the control circuit of said pulse wave coincidence circuit, said second variable delay circuit having a control circuit connected to the input of said pulse wave coincidence circuit and serving to introduce a time-delay between its input and output circuits which is inversely and substantially exponentially proportional to the rate of increase of the signals applied to the input circuit of said pulse wave coincidence circuit.

6. In combination, an input circuit adapted to be connected to a source of recurrent control pulses, means connected to said input circuit for instantaneously sampling the magnitude of said control pulses, a filter connected to the output of said sampling means, a servomotor responsive to the output of said filter, means for producing a control signal which varies in accordance with the position of the rotor of said motor, means for producing a series of pulses having a repetition rate harmonically related to the repetition rate of said control pulses, a first variable delay circuit responsive to said control signal and to said series of pulses for producing signals delayed after each pulse of said series a time which varies in accordance with the magnitude of said control signal, means connected to said input circuit for producing a control voltage having a magnitude which varies in accordance with the rate of increase in the magnitude of the control pulses, a second variable delay circuit responsive to the output of said first delay circuit and to said control voltage for delaying the signals produced by said first delay circuit a time which varies in accordance with the magnitude of said control voltage, and means interconnecting the output of said second delay circuit and the control circuit of said sampling means for actuating said sampling means in response to the delayed pulses.

7. In a radio system employing a pair of transmitters to produce a first and second series of pulse-modulated electromagnetic waves having predetermined time relationships, a receiver adapted to detect said waves and produce signals corresponding to said first and second series of pulses, means responsive to the output of said receiver for producing a series of pulses synchronized with said first series of pulses, means responsive to the output of said receiver for instantaneously sampling the magnitude of the pulses of said second series of pulses, a first variable delay circuit responsive to the output of said sampling means and to said series of synchronized pulses, a second variable delay circuit responsive to the output of said first delay circuit and having a control circuit responsive to said second series of pulses for producing signals delayed with respect to the signals produced by said first delay circuit a time which varies inversely in accordance with the rate of increase in the magnitude of the pulses of said second series, and means for actuating said sampling means in response to the signals produced by said second delay circuit.

8. The apparatus of claim 7 further including means for indicating the time-delay introduced by said first variable delay circuit.

9. In a radio system employing a pair of transmitters to produce a first and a second series of pulse-modulated electromagnetic waves having predetermined time relationships, a receiver adapted to detect said waves and produce signals corresponding to said first and second series of pulses, means responsive to the output of said receiver for producing a series of pulses synchronized with said first series of pulses, means responsive to the output of said receiver for instantaneously sampling the magnitude of the pulses of said second series of pulses, a servomotor responsive to the output of said sampling means, means for producing a control signal having a magnitude which varies in accordance with the position of the rotor of said motor, a first variable delay circuit responsive to said signal and to said series of synchronized pulses for producing signals delayed after said synchronized pulses a time which varies in accordance with the magnitude of said control signal, a second variable delay circuit responsive to the output of said first delay circuit and having a control circuit connected to the output of said receiver and responsive to said second series of pulses for producing signals delayed with respect to the signals produced by said first delay circuit a time which varies inversely in accordance with the rate of increase in the magnitude of the pulses of said second series, and interconnecting means between the output of said second delay circuit and the control circuit of said sampling means for actuating said sampling means in response to the signals produced by said second delay circuit.

10. The apparatus of claim 9 further including an indicator responsive to the position of the rotor of said motor for showing the time-delay between said first and said second series of pulses.

References Cited in the file of this patent

UNITED STATES PATENTS

| | | |
|---|---|---|
| 2,497,513 | Paine et al. | Feb. 14, 1950 |
| 2,523,244 | Woodward | Sept. 19, 1950 |